United States Patent Office 3,325,556
Patented June 13, 1967

3,325,556
SELECTIVE HYDROGENATION OF ACETYLENE IN A MIXTURE OF ACETYLENE AND OTHER UNSATURATED HYDROCARBONS
Armand J. De Rosset, Clarendon Hills, Ill., assignor to Universal Oil Products Company, Des Plaines, Ill., a corporation of Delaware
No Drawing. Filed May 18, 1964, Ser. No. 368,364
5 Claims. (Cl. 260—677)

This invention relates to a process for the selective hydrogenation of unsaturated hydrocarbons. More specifically, the invention is concerned with an improvement in the selective hydrogenation of acetylene in the presence of ethylene.

The term selective hydrogenation involves a simultaneous treatment of two or more unsaturated organic compounds containing, for the most part, varying degrees of unsaturation. These varying degrees of unsaturation may be of two types: (1) unsaturated compounds in which one compound contains an ethylenic type of saturation and the other compound contains an acetylenic type of saturation, and (2) one unsaturated compound is an olefin and the other compound is a polyolefin. The present invention is concerned with the former type of varied saturation in which a mixture of ethylene and acetylene is subjected to selective hydrogenation. The lower olefins which are useful in many phases of the chemical industry are readily available from the gaseous products recovered from various hydrocarbon cracking operations. In particular, ethylene which is produced by this method usually contains at least a relatively small proportion of acetylene as an impurity thereof. The further use of ethylene to prepare other organic compounds usually requires that the ethylene be of a suitable purity and therefore the acetylenic impurities must be removed prior to the subsequent use of ethylene. The hydrogenation of acetylene can be effected utilizing a comparatively active catalyst. However, the use of such an active catalyst will sometimes result in a reduction of the amount of ethylene. Conversely, the use of a catalyst less active in nature will avoid the loss of ethylene but will not achieve a high degree of acetylene removal.

It is therefore an object of this invention to provide a process for the selective hydrogenation of certain unsaturated hydrocarbons without disturbing to a great degree the presence of other unsaturated compounds containing a type of saturation different from that of the undesired hydrocarbons.

A further object of this invention is to provide a process whereby hydrocarbons containing an acetylenic or diolefinic degree of unsaturation may be selectively hydrogenated without disturbing a monoolefinic hydrocarbon.

In a broad aspect one embodiment of this invention resides in a process for the selective hydrogenation of acetylene in a mixture containing ethylene and acetylene which comprises adding carbon monoxide to said mixture and thereafter treating said mixture with hydrogen at an elevated temperature and elevated pressure in the presence of a hydrogenation catalyst.

A further embodiment of this invention is found in a process for the selective hydrogenation of acetylene in a mixture containing ethylene and acetylene which comprises adding from about 0.1 to about 1% by weight of carbon monoxide to said mixture and thereafter treating said mixture with an excess of hydrogen at a temperature in the range of from about 75° to about 150° C. and at a pressure in the range of from about 50 to about 1,000 pounds per square inch in the presence of a hydrogenation catalyst.

A specific embodiment of this invention is found in a process for the selective hydrogenation of acetylene in a mixture containing ethylene and acetylene which comprises adding from about 0.1 to about 1% by weight of carbon monoxide to said mixture and thereafter treating said mixture with an excess of hydrogen at a temperature in the range of from about 75° to about 150° C. and at a pressure in the range of from about 50 to about 1,000 pounds per square inch in the presence of a hydrogenation catalyst comprising palladium composited on lithiated alumina.

Other objects and embodiments will be found in the following further detailed description of this invention.

As hereinbefore set forth, it has now been discovered that a selective hydrogenation of a mixture containing dissimilarly unsaturated hydrocarbons may be effected in a manner hereinafter set forth in greater detail whereby the unsaturated hydrocarbons which contain an unwanted unsaturation may be hydrogenated while compounds containing a desired unsaturation are relatively unaffected by the reaction. The selective hydrogenation is effectively consummated by adding carbon monoxide to the feed gas mixture and thereafter contacting the resultant feed stock with a metal base hydrogenation catalyst and hydrogen at a more elevated temperature than the same feed gas could be contacted with the aforementioned catalyst in the absence of carbon monoxide. Thus, in a gas mixture consisting predominantly of ethylene, but also containing small amounts of acetylene and ethane, different degrees of conversion of acetylenes to ethylene or ethane can be realized, depending upon the proportion of hydrogen charged to the feed stock mixture. In addition, the ethylene contents of the feed stock mixture will undergo a relatively small conversion to ethane.

The process of this invention is usually effected at an elevated temperature and pressure, the temperature utilized being in the range of from about 50° to about 150° C. or more, while the pressures used will range from about 50 to about 1,000 pounds per square inch. The amount of carbon monoxide which is charged to the feed stock mixture of unsaturated hydrocarbons will also vary, the amount added usually being from about 0.1 to about 1% by weight of the unsaturated compounds in the feed stock mixture. In addition, another reaction condition under which the process of the present invention is operated will comprise a gaseous hourly space velocity, said space velocity usually being in a range of from about 3,000 to about 8,000 cubic feet of gas per cubic foot of catalyst per hour. The selective hydrogenation of the present process is effected by treating an admixture of dissimilarly unsaturated hydrocarbons and carbon monoxide with hydrogen in the presence of the hydrogenation catalyst, said hydrogen being added in a mole excess ranging from about one mole to about five moles of hydrogen per mole of acetylene. The hydrogenation catalysts which are used in the process of this invention preferably comprise a noble metal of Group VIII of the Periodic Table per se or composited on a solid support. A particularly preferred type of catalyst for this invention comprises platinum or palladium composited on a metal oxide support such as alumina which has been pretreated by the addition of a promoter. The promoters which may be used include the salts and hydroxides of alkali metals and alkaline earth metals, specific examples of these compounds include lithium nitrate, lithium hydroxide, potassium nitrate, potassium hydroxide, sodium nitrate, sodium hydroxide, calcium nitrate, magnesium nitrate, etc. The pretreated alumina containing the promoter is then impregnated with a salt of the noble metal and resulting composite is thereafter dried and calcined. It is also contemplated within the scope of this invention that other well-known hydrogenation catalysts including nickel and the nickel compounds, for example, may also be used although not necessarily with equivalent results.

The process of the present invention may be effected in any suitable manner and may comprise either a batch or continuous type of operation. For example, when a batch type operation is used, the desired hydrogenation catalyst is placed in an appropriate apparatus such as, for example, a rotating autoclave. The gaseous mixture comprising a mixture of ethylene and acetylene which has previously had added thereto about 0.5% by weight of carbon monoxide is charged to the autoclave. Following this, the autoclave and contents thereof are heated to the desired operating temperature while pressing in a predetermined amount of hydrogen. The autoclave and contents thereof are maintained at the desired operating conditions of temperature and pressure for a predetermined residence time at the end of which the autoclave and contents thereof are allowed to cool to room temperature and the reaction product comprising ethylene with a relatively small amount of acetylene and ethane is recovered.

The process of this invention may also be effected in a continuous type manner. When such a manner is used, a quantity of the hydrogenation catalyst which, for example, may comprise a noble metal such as palladium composited on a promoted alumina support is placed in a reaction zone which is maintained at the proper operating conditions of temperature and pressure. The feed stock comprising a mixture of acetylene and ethylene which has been pretreated by the addition thereto with carbon monoxide in an amount ranging from about 0.1 to about 10% by weight of carbon monoxide is charged to the reaction zone. In addition, hydrogen in a mole excess over the amount of acetylene present is also charged to the reaction zone through a separate line. The treated feed stock is withdrawn and recovered, analysis of the recovered product showing a relatively small amount of acetylene and a relatively small amount of ethane being present, the major portion of the feed mixture being ethylene.

It is also contemplated within the scope of this invention that unsaturated compounds in which the unsaturation differs from that of the desired product such as, for example, a mixture of monoolefins and diolefins may also be selectively hydrogenated according to the process of this invention, that is, by adding carbon monoxide to the feed mixture prior to contact with hydrogen and a hydrogenating catalyst whereby the diolefins will be selectively hydrogenated to form monoolefins while the monoolefins remain relatively unchanged in nature. A specific example of this would be the selective hydrogenation of a feed mixture comprising ethylene and butadiene, said feed mixture containing from about 0.1 to about 1% carbon monoxide. Treatment of this mixture with an excess of hydrogen in the presence of a hydrogenation catalyst will convert the butadiene to a mixture of n-butenes without obtaining any butanes or ethanes.

The following examples are given to illustrate the process of the present invention which, however, are not intended to limit the generally broad scope of the present invention in strict accordance therewith.

*Example I*

A hydrogenation catalyst was prepared by dissolving 24 grams of lithium nitrate in 948 cc. of water and pouring the resulting solution over 474 grams of calcined alumina. The composite was then dried in a rotary evaporator, further dried for a period of 2 hours at 200° C. in a muffle furnace and thereafter calcined for a period of 6 hours at 550° C. The promoted alumina support contained 0.5 wt. percent of lithium.

A palladium chloride solution containing 1.16 grams of palladium per milliliter was prepared. A portion (8.6 cc.) was diluted to 135 cc. with water and 2.6 cc. of concentrated hydrochloric acid was added thereto. This solution was poured over 104.5 grams of the above lithiated alumina. Following this, the catalyst was dried in a rotary evaporater and calcined for a period of 2 hours at 600° C. The calcined catalyst was ground to 20–30 mesh and reduced in the presence of hydrogen at a temperature of 120° C. for a period of 2 hours.

A reactor was loaded with 4.5 cc. of the catalyst prepared according to the above paragraph. A feed gas mixture comprising 0.3% acetylene, 25% ethylene, 0.3% carbon monoxide, 10.3% hydrogen and the remainder (64.1%), nitrogen, was charged to the reactor which was maintained at a temperature ranging from about 75° to about 150° C. In addition, the reactor was maintained at a pressure of about 100 pounds per square inch. The feed mixture was charged to the reactor at a gaseous hourly space velocity ranging from about 3500 to about 4100. The product resulting from the selective hydrogenation was recovered and analyzed by means of a gas-liquid chromatograph. The results of these runs are set forth in Table I below.

TABLE I

| Hours on Stream | 24 | 72 | 97 | 169 |
|---|---|---|---|---|
| Conditions: | | | | |
| Temperature, ° C | 76 | 86 | 90 | 136 |
| Pressure, p.s.i.g | 100 | 100 | 100 | 100 |
| GHSV | 4,050 | 3,650 | 4,150 | 3,940 |
| Product Analysis, mole percent: | | | | |
| $N_2$ | 64.0 | 63.8 | 63.6 | 64.0 |
| CO | 0.4 | 0.4 | 0.4 | 0.4 |
| $H_2$ | 10.0 | 9.6 | 10.0 | 9.3 |
| $C_2H_2$ [a] | 1.0 | 1.0 | 20.0 | <1.0 |
| $C_2H_4$ | 25.5 | 27.0 | 25.9 | 26.2 |
| $C_2H_6$ | 0.1 | 0.1 | 0.1 | 0.1 |

[a] Acetylene analyses are p.p.m. by titration of silver nitrate scrubber

*Example II*

To illustrate the selective hydrogenation of a diolefinic hydrocarbon in which the monoolefin remains, for all practical purposes, unchanged, a feed stock comprising a mixture of acetylene and butadiene along with oxygen and carbon monoxide was subjected to hydrogenation in a manner similar to that set forth in the above example. A catalyst prepared in a manner similar to that set forth in Example I above was placed in a reactor and a feed stock comprising 1.0% oxygen, 0.3% carbon monoxide, 8.9% hydrogen, 0.3% acetylene, 23.0% ethylene and 0.9% butadiene was charged to a reactor containing this catalyst. The results of this experiment are set forth in Table II below.

TABLE II

| Hours on Stream | 5 | 97 |
|---|---|---|
| Conditions: | | |
| Temperature, ° C | 154 | 154 |
| Pressure, p.s.i.g | 100 | 100 |
| GHSV | 3,920 | 3,780 |
| Product Analysis, mole percent: | | |
| $N_2$ | 65.6 | 65.3 |
| $O_2$ | 0.9 | 0.9 |
| CO | 0.5 | 0.4 |
| $H_2$ | 7.5 | 8.1 |
| $C_2H_2$ [a] | 2.0 | <1.0 |
| $C_2H_4$ | 24.1 | 23.8 |
| $C_2H_6$ | 0.5 | 0.8 |
| $C_4H_6$ | 0.0 | 0.0 |
| $C_4H_8$ | 0.9 | 0.7 |

[a] Acetylene analyses are p.p.m. by titration of silver nitrate scrubber

As shown in the above examples, from Tables I and II it is readily apparent that a selective hydrogenation process in which two distinct types of unsaturation are present may be effected whereby the desired type of unsaturation, namely, ethylenic unsaturation, is relatively uneffected and the undesired unsaturation which, in this instance, comprises either acetylenic unsaturation or diolefinic unsaturation is successfully treated to remove the same.

Example III

In this example a selective hydrogenation catalyst is prepared by treating calcined gamma-alumina with a solution of lithium nitrate dissolved in water. The resulting composite is dried in a rotary evaporator, thereafter further dried for an additional period of time at an elevated temperature and then calcined at a temperature of about 550° C. for a period of about six hours. A platinum chloride solution which contains about 1.15 kg. per cc. is diluted with water and concentrated hydrochloric acid. The diluted solution is poured over the lithiated gamma-alumina base which has been prepared according to the above paragraph. The resulting catalyst is dried and calcined at a temperature of about 600° C. for two hours. Following this, the catalyst is ground and reduced in a hydrogen atmosphere for two hours at a temperature of about 120° C.

A reactor is loaded with the catalyst prepared according to the above steps. A feed gas mixture comprising 0.3% actylene, 25% ethylene, 0.4% carbon monoxide, 10.3% hydrogen and the remainder, nitrogen, is charged to this reactor which is maintained at a temperature ranging from about 75° to about 150° C. The reactor is also maintained at a pressure of about 100 pounds per square inch. The feed mixture is charged to the reactor at a gaseous hourly space velocity ranging from about 3500 to about 4100. The product resulting from the selective hydrogenation is recovered and analyzed by means of a gas-liquid chromatograph, said analyses showing a recovery of a minor amount of acetylene, usually less than 20 parts per million, along with about 0.1% ethane. The analyses will also shown a net increase of ethylene.

After a predetermined period on stream of the aforementioned mixture, the feed stock is altered, the new stock comprising a mixture containing 1.0% oxygen, 0.3% carbon monoxide, 8.9% hydrogen, 0.3% acetylene, 23.0% ethylene and 0.9% butadiene, the remainder being 65.6% nitrogen. After passage over the selective hydrogenation catalyst in the presence of the aforementioned carbon monoxide, the product is recovered and subjected to gas-liquid chromatography. The results will show the presence of a net increase of ethylene with relatively minor amounts of acetylene and ethane, the butadiene present having been converted to butenes.

I claim as my invention:

1. A process for the selective hydrogenation of acetylene in a mixture containing ethylene and acetylene which comprises adding carbon monoxide to said mixture and thereafter treating said mixture with an excess of hydrogen at an elevated temperature and elevated pressure in the presence of a hydrogenation catalyst comprising a noble metal composited on lithiated alumina.

2. A process for the selective hydrogenation of acetylene in a mixture containing ethylene and acetylene which comprises adding carbon monoxide to said mixture and thereafter treating said mixture with an excess of hydrogen at an elevated temperature and elevated pressure in the presence of a hydrogenation catalyst comprising palladium composited on lithiated alumina.

3. A process for the selective hydrogenation of acetylene in a mixture containing ethylene and acetylene which comprises adding carbon monoxide to said mixture and thereafter treating said mixture with an excess of hydrogen at an elevated temperature and elevated pressure in the presence of a hydrogenation catalyst comprising platinum composited on lithiated alumina.

4. A process for the selective hydrogenation of acetylene in a mixture containing ethylene and acetylene which comprises adding from about 0.1 to about 1% by weight of carbon monoxide to said mixture and thereafter treating said mixture with an excess of hydrogen at a temperature in the range of from about 75° to about 150° C. and at a pressure in the range of from about 50 to about 1,000 pounds per square inch in the presence of a hydrogenation catalyst comprising palladium composited on lithiated alumina.

5. A process for the selective hydrogenation of acetylene in a mixture containing ethylene and acetylene which comprises adding from about 0.1 to about 1% by weight of carbon monoxide to said mixture and thereafter treating said mixture with an excess of hydrogen at a temperature in the range of from about 75° to about 150° C. and at a pressure in the range of from about 50 to about 1,000 pounds per square inch in the presence of a hydrogenation catalyst comprising platinum composited on lithiated alumina.

References Cited

UNITED STATES PATENTS

| | | | |
|---|---|---|---|
| 2,946,829 | 7/1960 | Likins | 260—677 |
| 3,068,303 | 12/1962 | Pattison | 260—677 |
| 3,084,023 | 4/1963 | Andersen et al. | 260—677 |

OTHER REFERENCES

Reitmeier et al., Chem. Eng. Progress, 54, No. 12, December 1958, pages 48 to 51.

Ser. No. 397,105, Klein (A.P.C.), published April 1943.

DELBERT E. GANTZ, *Primary Examiner.*

ALPHONSO D. SULLIVAN, *Examiner.*